INVENTORS
JOHN G. CADILLAC
ROBERT T. CADILLAC
BY Richard O. Church

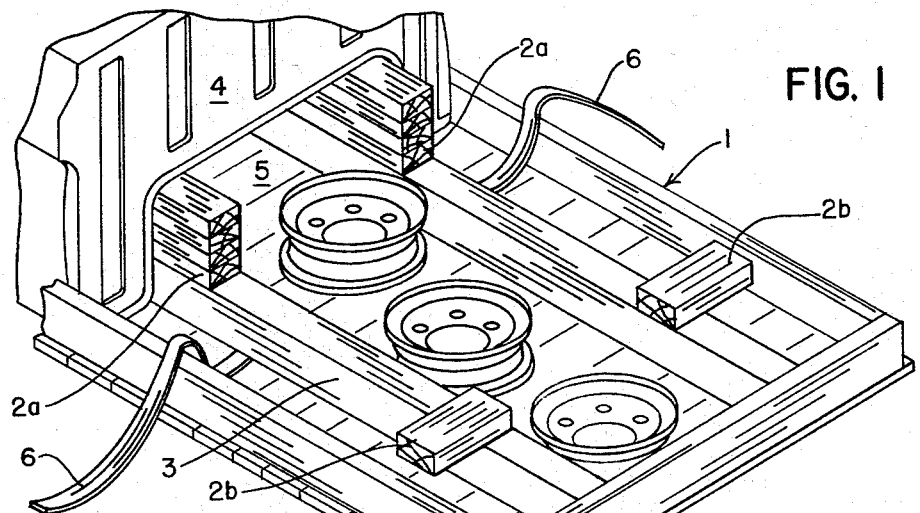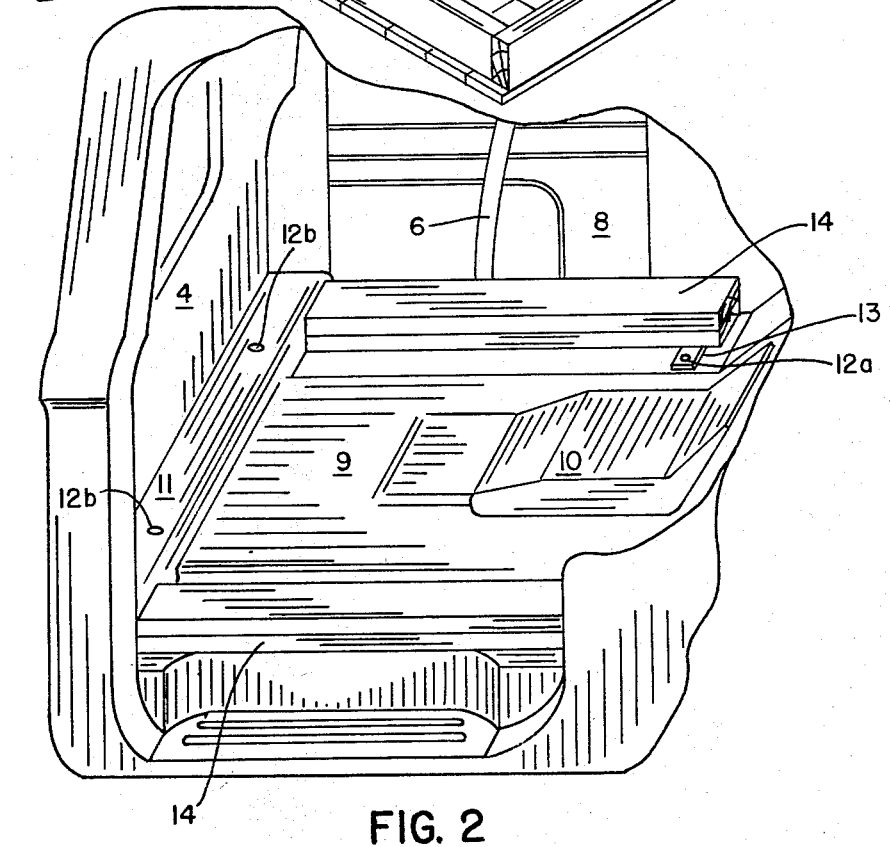

Nov. 22, 1966   J. G. CADILLAC ET AL   3,286,827
VEHICLE PACKAGING

Filed Dec. 21, 1964   3 Sheets-Sheet 3

INVENTOR
JOHN G. CADILLAC
ROBERT T. CADILLAC
BY
Richard O. Church

United States Patent Office 3,286,827
Patented Nov. 22, 1966

3,286,827
VEHICLE PACKAGING
John G. Cadillac, Saddle River, N.J., and Robert T. Cadillac, Brooklyn, N.Y., assignors to Aacon Contracting Co., Inc., a corporation of New York
Filed Dec. 21, 1964, Ser. No. 420,013
10 Claims. (Cl. 206—47)

This invention relates to methods and means for crating vehicles for shipment. More particularly, this invention is concerned with methods and means for reducing the size of a crate into which a vehicle may be packaged by efficiently utilizing the interior of a cab or body of the vehicle as a space for stowing heavy components of the vehicle, such as engines, transmissions, differentials, and the like.

In preparing vehicles for overseas shipment, it is common practice to enclose them in a protective crate or box. The use of these crates is highly advantageous, as it facilitates handling and loading of the vehicles; it conserves cargo space as within a ship's hold by making it possible to stack one crate on top of another; and the crates serve to protect the vehicles from damage in high seas and in performing the above handling and loading operations.

Rates for the overseas shipment of various goods are based not only upon the weight of the articles that are being shipped, but also upon the volume occupied by the crates themselves (herein referred to as "cubage"). As the cost of shipping vehicles overseas may represent a significant percentage of the final selling price of such vehicles, it is important to improve upon crating and boxing techniques in order to minimize or reduce these shipping costs. It can readily be understood that the weight of a vehicle represents a substantially fixed quantity, and thus a reduction in shipping costs can be achieved only by reducing the cubage of the crated vehicle.

In our Patent 2,953,848, we disclosed a significant improvement in the packaging of vehicles for overseas shipment. According to this patent, the motor vehicles are first fully assembled at the factory; they are then road tested or otherwise inspected to ascertain the completeness and operability of the assembly; and finally, the operative vehicle is disassembled into major subassemblies, and these various subassemblies are packaged together into the smallest possible volume as is consistent with securing and protecting the parts from damage as by handling, rough seas, and the like. By use of this method, considerable reduction in shipping costs is effected.

The packaging of the vehicle cab, one of the major subassemblies mentioned above, is detailed in our Patent 2,917,165. In this patent, we describe a method whereby the cab itself is utilized as a container for various of the disassembled parts, such as tires, wheels, seats and fenders. By making use of this otherwise empty space, a reduction in the volume of the completed package is obtained, and shipping costs are reduced accordingly. While the means described in this patent are effective to accomplish significant savings in overall cubage, the space within the cab may usually be utilized only in packaging comparatively light components of a vehicle. Heavier components, such as engines, transmissions, differentials, and the like, may not always be placed in the cab due to the comparatively light gauge metal used in fabricating the cab floor which has insufficient strength to support these heavy loads.

Accordingly, it is an object of this invention to minimize shipping costs in transporting vehicles overseas.

Another object of this invention is to minimize cubage in crating vehicles for shipment.

Yet another object of this invention is to provide for maximum utilization of the interior of vehicle cabs as a packaging space when crating a vehicle as for overseas shipment.

Still another object of this invention is to provide methods and means whereby heavy vehicular components, such as engines, transmissions, differentials, and the like, may be securely packaged within a vehicle cab.

Briefly, these and other objects of this invention are achieved by distributing the weight of heavy vehicle components packaged within the cab along those areas of the cab floor that have the greatest structural strength. As has been mentioned, the cab floor is fabricated from light gauge metal and does not have sufficient strength to support a heavy load. However, greater strength is provided along those areas where the cab body is in contact with and affixed to the chassis, and it is at these areas that loads must be distributed in order to utilize the points of greatest structural strength of the cab to support heavy loads.

For convenience and ease in description, the strength members of the floor of the cab that rest upon and form points of attachment of the cab to the chassis are referred to herein as the "cab support members."

As described in our previously referred to Patent 2,917,165, vehicular cabs may be boxed by first placing them on a pallet or skid (which serves as the bottom of the crate) slightly larger than the cab. In the preferred practice of this invention, it is usually advantageous to prepare such wooden pallets of sufficient length to enable more than one cab to be mounted thereon so that several cabs may be enclosed in a single crate.

A plurality of wooden blocks, or support blocks, are attached to the pallet and are suitably dimensioned to contact the underneath portions of the cab at the cab support members to support the cab and maintain it in a level position. Further, these support blocks are positioned to engage the cab support members at least at those points where holes in the floor of the cab are provided to bolt the cab to the chassis.

Load distributing means are then placed on the interior floor of the cab to distribute the weight of the vehicle components to be packaged within the cab along the cab support members. These load distributing members are anchored to the floor of the cab as by driving lag screws through these holes into the support blocks positioned under the cab body. Additional features of this invention, such as the use of suitable hold-down straps, a platform elevated from the floor of the cab, and a cradle for supporting the vehicle components will be discussed in more detail in the description of the accompanying drawings in which:

FIG. 1 is a perspective view of a pallet showing a rear portion of a cab body affixed thereto and ready to receive a second cab.

FIG. 2 is a perspective view, partially broken away, of the interior of a vehicle cab with the load distributing means anchored along the cab support members.

Figure 3:
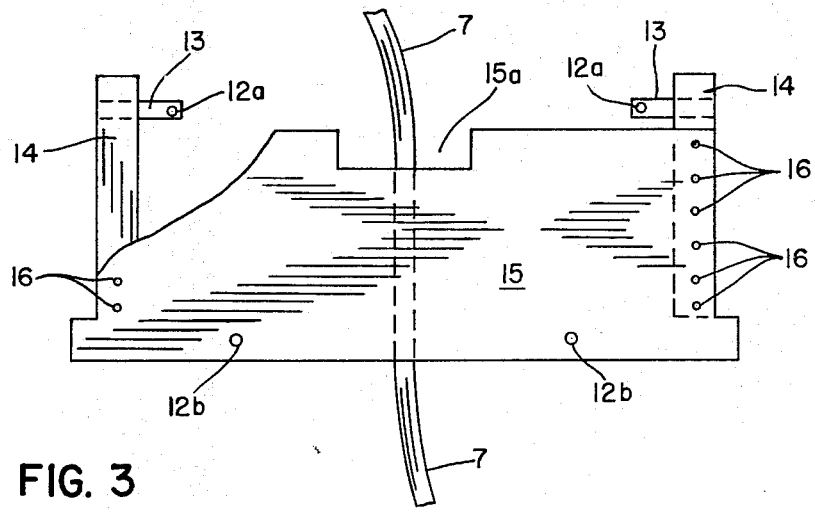
FIG. 3 is a plan view, partially broken away, of the elevated platform as secured to the load distributing means and to the cab.

In FIG. 1, there is generally shown a pallet 1 suitable to serve as the base of a crate for packaging vehicular cabs. This pallet 1 is constructed slightly larger in width than the cab body to be mounted thereon. As shown in FIG. 1, the pallet 1 is designed for mounting two cabs, although this is not important to the invention. A portion of the rear of one cab 4 can be seen mounted upon the pallet, and the remaining portion of the pallet is prepared to receive another cab in back-to-back relationship.

The rear of the cab 4 is shown mounted upon support blocks 2b. These support blocks 2b will also serve to support the rear of the second cab when it is positioned on the pallet. Support blocks 2a are provided to engage a forward portion of the cab. Both the support blocks 2a and 2b are attached to stringers 3 that run the length of the pallet 1 and serve both as strength members and as points of attachment for the support blocks 2a and 2b.

The space 5 between the bottom of the cab and the top of the pallet may be utilized for stowing various items such as wheels, fenders, drive shafts, and the like. Also in FIG. 1, there are shown hold-down straps 6 which are secured to the pallet as to stringers 3. These straps 6, as will later become more apparent, are led through the door of the cab and are used to secure the components packaged within the cab from lateral movement.

Referring to FIG. 2, an interior view of a cab, partially broken away, is illustrated, showing the rear wall of the cab 4, one door 8, the cab floor 9, and the transmission and drive shaft tunnel 10. Note that the particular cab illustrated in FIG. 2 has a small rear ledge 11 slightly elevated from the floor 9; however, this feature is not necessary in the practice of this invention.

Load distributing means 14 are positioned within the cab to lie upon the cab support members. Brackets 13 have been stapled to the load distributing means 14 and are drilled with holes 12a positioned to coincide with the forward bolt holes in the cab where the cab is bolted to the chassis. The rear bolt holes for attaching the cab to the chassis are shown as at 12b.

In order to secure the load distributing means 14 partially in position, lag bolts are inserted through the holes 12a of brackets 13, through the bolt holes in the forward part of the cab, and driven into the support blocks 2a.

In FIG. 3, a plan view of an elevated platform 15 is shown as secured to both the load distributing means 14 and the rear of the cab at 12b. The platform 15 is fashioned generally to conform to the interior lower portion of the cab and a cut-out 15a is provided to accommodate the transmission and drive shaft tunnel 10. This platform 15, which is elevated over the floor 9 of the cab, is anchored to the rear ledge 11 of the cab by lag bolts which are inserted through the rear bolt holes 12b and are driven into the rear support blocks 2b.

The load distributing means 14 are of suitable height to be flush with the upper surface of the ledge 11 so that the platform 15 may rest evenly on the load distributing means 14 and the ledge 11. To unify the structure, nails 16 are driven through the platform 15 into load distributing means 14. This serves to secure the platform 15 to the load distributing means 14 and provides stability for the entire structure since: the load distributing means 14 are secured at the forward part of the cab by lag bolts at 12a; the platform is secured at the rear of the cab by lag bolts at 12b; and both the platform 15 and the load distributing means 14 are rigidly secured to each other by means of nails 16.

It can also be seen in FIG. 3 that a strap 7 may be stapled to the underside of the platform 15 in position to be secured to the vehicle parts packaged within the cab to prevent fore and aft motion.

The structure described with respect to FIG. 3 above is particularly suitable when there is a small rear ledge 11 in the cab. While not illustrated in the drawings, this invention is also readily adaptable to cabs in which such ledge is not present. In such instance, brackets 13 can be attached to both ends of the load distributing means 14 and the forward bracket attached at bolt hole 12a and the rear bracket attached at bolt hole 12b. When this construction is used, the load distributing means 14 are fixedly positioned without relying upon the presence of the platform 15. However, with either type of construction, it is advantageous to install the platform 15 as it lends stability to and unifies the structure, as well as making it easier to load and unload a cradle containing heavy parts. It should be understood, however, that the weight of the components placed within the cab are, in any instance, borne by the load distributing means 14 rather than by the platform 15.

Figure 4:
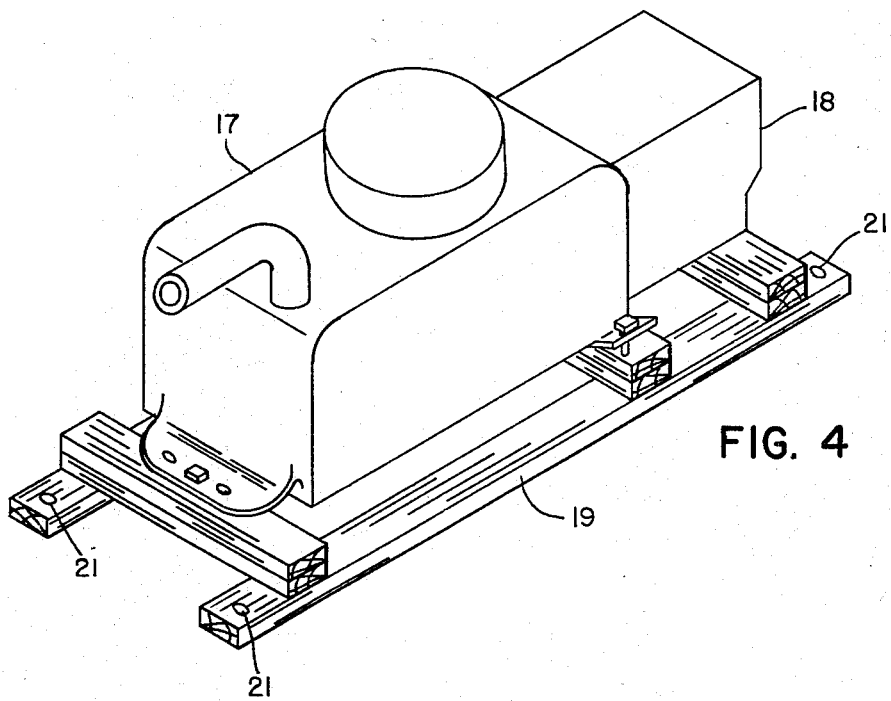
FIG. 4 is a schematic view of an engine and its attached transmission mounted on a cradle suitable for insertion and mounting into the interior of a vehicle cab.

FIG. 4, in somewhat schematic form, illustrates an engine 17 and an attached transmission 18 mounted on a cradle 19. The cradle 19 is designed so that the points of attachment of the engine to the chassis may be utilized to mount the engine and transmission securely on the cradle 19. Note that the ends of cradle 19 are provided with bolt holes 21.

Figure 5:
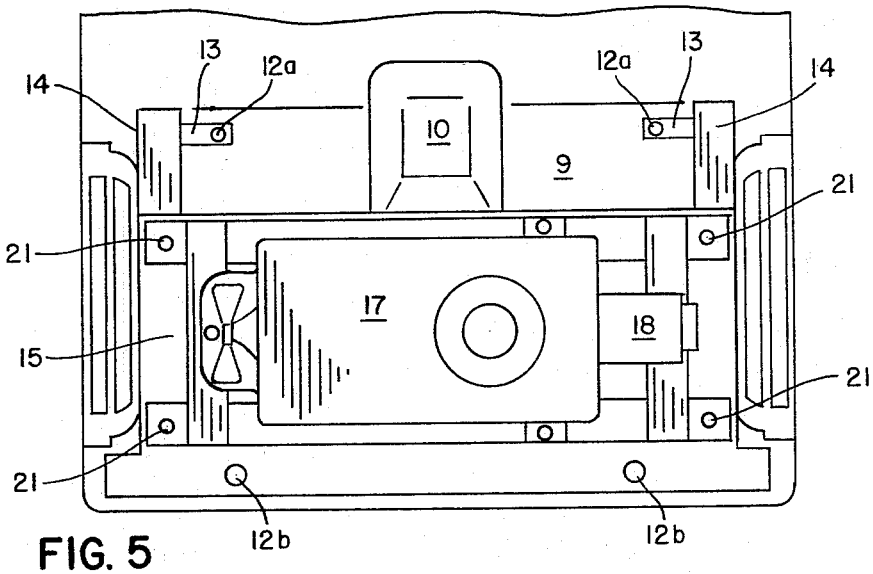
FIG. 5 is a plan view of the engine and transmission mounted within the cab.

In FIG. 5, cradle 19, with the engine 17 and transmission 18, has been positioned transversely within the cab so that the bolt holes 21 are aligned over the load distributing means 14. Lag bolts are inserted in bolt holes 21 and driven through the platform 15 into the load distributing means 14, thus securing the cradle within the cab.

Figure 6:
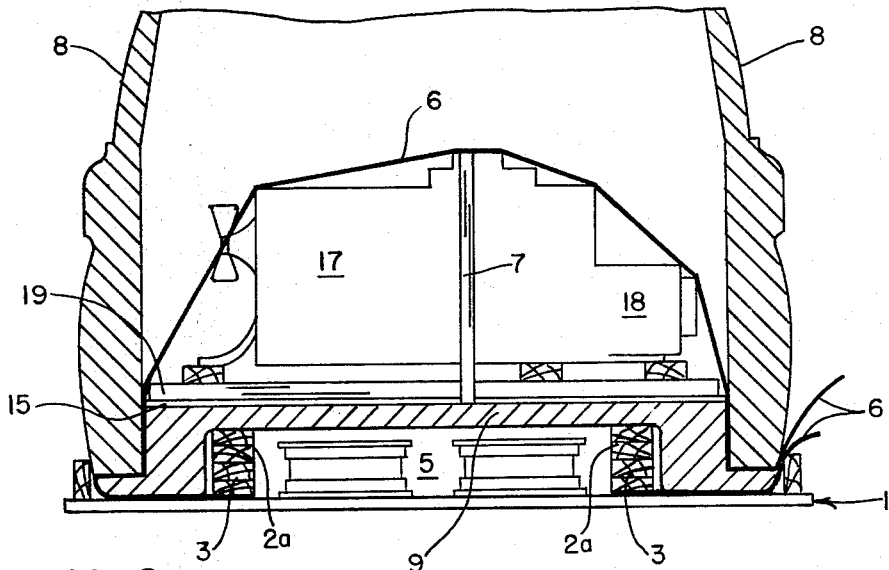
FIG. 6 is an elevated view of the completed assembly secured within the cab (partially broken away) with hold-down straps securing the assembly.

In FIG. 6, the completed assembly is shown. Note that both the transverse straps 6 and the fore and aft straps 7 have been secured about the engine 17 further to insure that the engine 17 and its transmission 18 will not be dislodged from their position within the cab in handling and transport. The cab doors 8 are closed on the straps 6 in order that any upward thrusts may be taken by the door rather than the lower portion of the cab. This is important since the doors are strong and rigid as compared to the comparatively weak cab side walls.

While not shown in the drawings, any additional space remaining within the cab may be filled with other small disassembled parts from the vehicle. After this is accomplished, the remainder of the crate is built up in the usual way from the pallet 1 to complete the enclosure of the cab.

As this invention may be embodied in several forms without departing from the spirit or essential characteristics thereof, the embodiments described in the foregoing specification are, therefore, illustrative and not restrictive, since the scope of the invention is defined by the appended claims rather than the description preceding them, and all changes that fall within the metes and bounds of the claims, or forms that are functionally as well as conjointly cooperative equivalents, are intended to be embraced by these claims.

We claim:

1. A method for crating vehicles comprising the steps of disassembling a vehicle into major subassemblies including a cab as one of said major subassemblies; mounting said cab on a pallet and supporting it at least at those points where said cab support members are drilled for attachment to a chassis; securing load distributing means along a substantial portion of the upper surface of said cab support members; securing a heavy subassembly to a cradle; and securing said cradle to said load distributing means.

2. A method according to claim 1 in which said heavy subassembly is an engine.

3. A method according to claim 1 in which said load distributing means are secured by utilizing said drilled points of attachment.

4. A method according to claim 1 in which a protective platform is anchored upon and extends between said load distributing means.

5. A method according to claim 4 in which said platform is engaged in securing relationship with said load distributing means.

6. A method according to claim 5 in which a securing strap is associated with the lower portion of said platform and is adapted to secure said heavy subassemblies from fore and aft motion.

7. A method according to claim 1 in which securing straps are associated with said pallet and are adapted to be led through the underside of the doors of said cab in order to secure said heavy subassemblies from lateral motion.

8. A vehicle cab and box for shipping which comprises, a pallet forming the bottom of the box; a plurality of support blocks secured to said pallet and positioned to engage the underside of said cab at the cab support members at those points where holes are drilled to secure said cab to its chassis; load distributing means positioned along the floor of said cab extending along and resting upon the cab support members; fastening means for securing said load distributing means in said position; and cradle means for supporting heavy subassemblies, said cradle means being secured in load bearing relationship to said load distributing means.

9. A vehicle cab and box according to claim 8 in which a platform is anchored to said load distributing means intermediate said load distributing means and said cradle.

10. A vehicle cab and box according to claim 8 in which said load distributing means are secured to said support blocks by fastening means passing through said holes in said cab support members for attaching said cab to said chassis.

No references cited.

LOUIS G. MANCENE, *Primary Examiner.*

MARTHA L. RICE, *Examiner.*